United States Patent
Matsumura et al.

(10) Patent No.: US 12,028,680 B2
(45) Date of Patent: Jul. 2, 2024

(54) OPTICAL MICROPHONE

(71) Applicant: Panasonic Intellectual Property Corporation of America, Torrance, CA (US)

(72) Inventors: Toshiyuki Matsumura, Osaka (JP); Yuki Terashima, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 217 days.

(21) Appl. No.: 17/846,284

(22) Filed: Jun. 22, 2022

(65) Prior Publication Data
US 2022/0322014 A1    Oct. 6, 2022

Related U.S. Application Data

(63) Continuation of application No. PCT/JP2021/006663, filed on Feb. 22, 2021.
(Continued)

(30) Foreign Application Priority Data

Jan. 20, 2021    (JP) .................................. 2021-007464

(51) Int. Cl.
*H04R 23/00*        (2006.01)
*G02B 27/10*        (2006.01)
(Continued)

(52) U.S. Cl.
CPC ......... *H04R 23/008* (2013.01); *G02B 27/106* (2013.01); *G02B 27/30* (2013.01);
(Continued)

(58) Field of Classification Search
CPC .............................. H04R 23/008; H04R 3/005
(Continued)

(56) References Cited

U.S. PATENT DOCUMENTS 6,301,034 B1 * 10/2001 Speciale .............. H04R 23/008
                                                              398/151
9,344,811 B2 *   5/2016 Bakish ................... A41D 13/11
(Continued)

FOREIGN PATENT DOCUMENTS

JP          59-174100          10/1984
JP          60-18100            1/1985
(Continued)

OTHER PUBLICATIONS

International Search Report (ISR) issued on May 18, 2021 in International (PCT) Application No. PCT/JP2021/006663.

*Primary Examiner* — Disler Paul
(74) *Attorney, Agent, or Firm* — Wenderoth, Lind & Ponack, L.L.P.

(57) ABSTRACT

An optical microphone includes: a light source; a first optical divider dividing light from the light source into reference light and measurement light; a second optical divider dividing the measurement light into N measurement light beams; a first emitter emitting the N measurement light beams from different positions toward a predetermined space; a first light receiver receiving the N measurement light beams having propagated through the space; a third optical divider dividing the reference light into N reference light beams; N optical couplers coupling the N measurement light beams with the N reference light beams on a one-to-one basis; N optical detectors receiving N coupled light beams and each detecting interference between the measurement light beam and the reference light beam in the corresponding coupled light beam; and a controller controlling directionality of sound pickup by performing signal processing on N detection signals from the N optical detectors.

5 Claims, 8 Drawing Sheets

Related U.S. Application Data

(60) Provisional application No. 62/981,210, filed on Feb. 25, 2020.

(51) Int. Cl.
*G02B 27/30* (2006.01)
*G02F 1/31* (2006.01)
*G02F 2/00* (2006.01)
*H04R 1/40* (2006.01)
*H04R 3/00* (2006.01)

(52) U.S. Cl.
CPC ............... *G02F 1/31* (2013.01); *G02F 2/00* (2013.01); *H04R 1/406* (2013.01); *H04R 3/005* (2013.01)

(58) Field of Classification Search
USPC ...................................... 381/91–92
See application file for complete search history.

(56) References Cited

U.S. PATENT DOCUMENTS

| | | | |
|---|---|---|---|
| 9,417,147 B2 * | 8/2016 | Fischer | G01D 5/266 |
| 9,510,110 B2 * | 11/2016 | Lee | H04R 23/008 |
| 9,641,941 B2 * | 5/2017 | Fischer | H04R 23/008 |
| 10,448,172 B2 * | 10/2019 | Blumkin | H04B 10/506 |
| 2005/0052724 A1 | 3/2005 | Suzuki et al. | |

FOREIGN PATENT DOCUMENTS

| | | |
|---|---|---|
| JP | 2000-78695 | 3/2000 |
| JP | 2005-283160 | 10/2005 |
| JP | 2007-295131 | 11/2007 |

\* cited by examiner

OPTICAL MICROPHONE

CROSS REFERENCE TO RELATED APPLICATIONS

This is a continuation application of PCT International Application No. PCT/JP2021/006663 filed on Feb. 22, 2021, designating the United States of America, which is based on and claims priority of U.S. Provisional Patent Application No. 62/981,210 filed on Feb. 25, 2020 and Japanese Patent Application No. 2021-007464 filed on Jan. 20, 2021, The entire disclosures of the above-identified applications, including the specifications, drawings and claims are incorporated herein by reference in their entirety.

FIELD

The present disclosure relates to an optical microphone capable of picking up sounds over a wide band.

BACKGROUND

Patent Literature (PTL) 1 discloses a laser microphone device that converts a sound signal into an electrical signal via laser light. In so doing, such laser microphone device uses laser light to detect changes in the refractive index of air caused by sound, without using a diaphragm that is used by a typical microphone which electrically detects vibrations of the diaphragm caused by sound.

CITATION LIST

Patent Literature

PTL 1: Japanese Unexamined Patent Application Publication No. 59-174100

SUMMARY

Technical Problem

However, it is difficult for the laser microphone device disclosed in PTL 1 to localize the direction of the sound source from the device.

The present disclosure provides an optical microphone capable of controlling the directionality toward a sound source.

Solution to Problem

The optical microphone according to an aspect of the present disclosure is an optical microphone including: a light source; a first optical divider that divides light emitted from the light source into reference light and measurement light; a second optical divider that divides the measurement light into N measurement light beams, where N is an integer greater than or equal to 2; a first emitter that emits the N measurement light beams from mutually different positions toward a predetermined space; a first light receiver that receives the N measurement light beams that have propagated through the predetermined space; a third optical divider that divides the reference light into N reference light beams; N optical couplers that couple the N measurement light beams received by the first light receiver with the N reference light beams on a one-to-one basis; N optical detectors that receive N coupled light beams coupled by the N optical couplers, each of the N optical detectors detecting interference between a corresponding one of the N measurement light beams and a corresponding one of the N reference light beams in a corresponding one of the N coupled light beams; and a controller that controls directionality of sound pickup by performing signal processing on N detection signals outputted from the N optical detectors.

Advantageous Effects

The optical microphone according to the present disclosure is capable of controlling the directionality toward a sound source.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
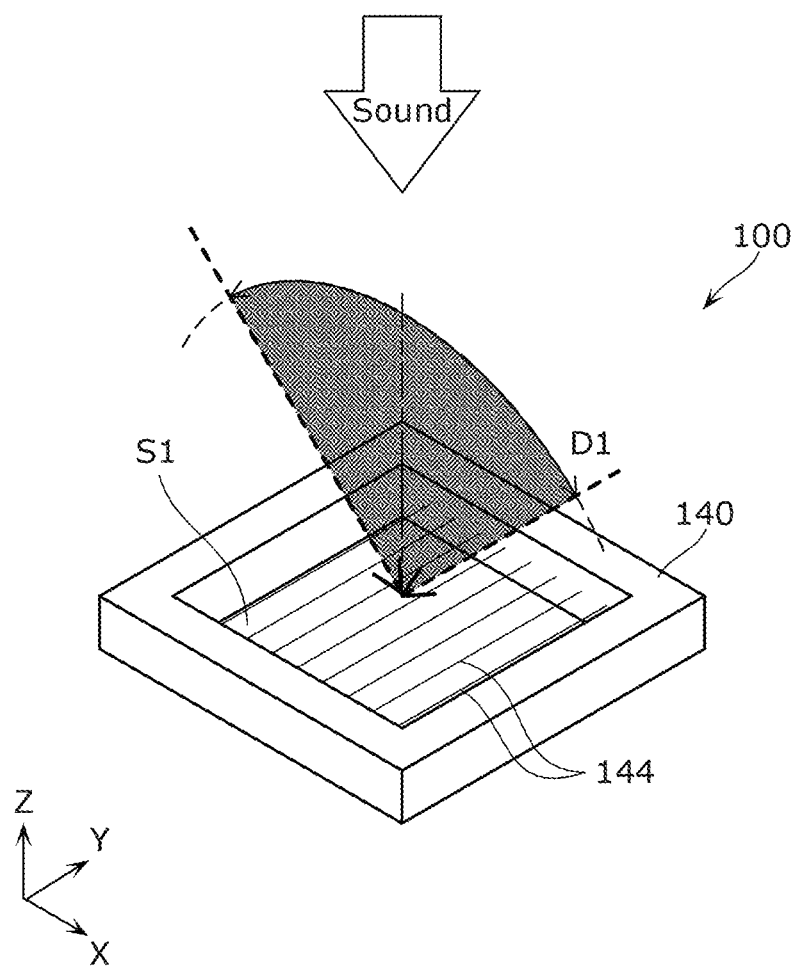
FIG. 1 is a perspective view for schematically explaining an optical microphone according to Embodiment 1.

DESCRIPTION OF EMBODIMENTS (Underlying Knowledge Forming Basis of the Present Disclosure)

The laser microphone device disclosed in PTL 1 detects sound, without using a diaphragm, in the following manner: the laser microphone device utilizes a phenomenon in which laser light emitted from the light source is modulated when the laser light passes through sound waves outputted from the sound source, in accordance with air density caused by the sound waves; and detects the modulated laser light by optical detectors.

However, the inventors have found that it is difficult for such laser microphone device to control the directionality toward the sound source. Also, when sound sources in two different locations are present, the above problem makes it difficult for the laser microphone device to distinctively detect these two sound sources.

In view of the above problems, the present inventors have conceived an optical microphone capable of controlling the directionality toward a sound source.

The optical microphone according to an aspect of the present disclosure includes: a light source; a first optical divider that divides light emitted from the light source into reference light and measurement light; a second optical divider that divides the measurement light into N measurement light beams, where N is an integer greater than or equal to 2; a first emitter that emits the N measurement light beams from mutually different positions toward a predetermined space; a first light receiver that receives the N measurement light beams that have propagated through the predetermined space; a third optical divider that divides the reference light into N reference light beams; N optical couplers that couple the N measurement light beams received by the first light receiver with the N reference light beams on a one-to-one basis; N optical detectors that receive N coupled light beams coupled by the N optical couplers, each of the N optical detectors detecting interference between a corresponding one of the N measurement light beams and a corresponding one of the N reference light beams in a corresponding one of the N coupled light beams; and a controller that controls directionality of sound pickup by performing signal processing on N detection signals outputted from the N optical detectors.

The optical microphone with the above configuration causes the N measurement light beams to propagate through the predetermined space intended for sound detection and detects interferences between the reference light beams and the N measurement light beams that are modulated in accordance with air density caused by sounds that propagate through the air inside of the predetermined space. The optical microphone then performs the signal processing on the resulting N detection signals to detect sounds in the N different positions. With this, it is possible to control the directionality of sound pickup to enable the detection of sounds from arrival directions that are inclined at an angle toward the direction in which the N measurement light beams are aligned.

Also, the first emitter may include N first collimating lenses that are disposed in the mutually different positions and convert the N measurement light beams into collimated light beams, the first light receiver may include N second collimating lenses that are disposed opposite to the N first collimating lenses across the predetermined space, and the N second collimated lenses may receive the N measurement light beams that have been converted into the collimated light beams by the N first collimating lenses.

With this, the N measurement light beams that propagate through the predetermined space are each converted into collimated light. This thus enables an effective detection of air density caused by the propagating sounds.

Also, the N first collimating lenses and the N second collimating lenses may be disposed to cause the N measurement light beams converted into the collimated light beams to be aligned parallel to each other at equal intervals in the predetermined space.

This enables an easy detection of sounds to the predetermined space from the arrival directions that are included at an angle toward the direction in which the N measurement light beams are aligned. This also reduces processing load on the processes performed on the N signals.

The optical microphone may further include an optical modulator that modulates the reference light and outputs the reference light modulated to the third optical divider. The controller may include: a frequency modulation (FM) demodulator that demodulates the N detection signals; an analog to digital (AD) converter that performs an AD conversion on the N detection signals; and a signal processor that performs the signal processing on the N detection signals that have undergone the AD conversion.

This enables an effective detection of sounds from interferences between the measurement light beams and the reference light beams.

The optical microphone may further include: an optical switch that selectively switches a destination to which the first optical divider emits the measurement light between a first emission window and a second emission window, the first emission window being optically connected to the second optical divider; a fourth optical divider that divides the measurement light emitted from the second emission window into M measurement light beams, where M is an integer between 2 and N, inclusive; a second emitter that emits the M measurement light beams divided by the fourth optical divider from mutually different positions toward the predetermined space; and a second light receiver that receives the M measurement light beams that have propagated through the predetermined space. Here, a first emission direction and a second emission direction may intersect with each other, the first emission direction being a direction in which the first emitter emits the N measurement light beams, the second emission direction being a direction in which the second emitter emits the M measurement light beams. M optical couplers among the N optical couplers may couple the M measurement light beams received by the second light receiver with M reference light beams among the N reference light beams on a one-to-one basis. M optical detectors among the N optical detectors may receive M coupled light beams coupled by the M optical couplers, and each of the M optical detectors may detect interference between a corresponding one of the M measurement light beams and a corresponding one of the M reference light beams in a corresponding one of the M coupled light beams. The controller may (i) control the directionality of sound pickup along a direction in which the N measurement light beams are aligned by performing the signal processing on the N detection signals that are outputted from the N optical detectors when the first emission window emits the measurement light in response to a control performed on the optical switch, and (ii) control the directionality of sound pickup along a direction in which the M measurement light beams are aligned by performing the signal processing on the M detection signals that are outputted from the M optical detectors when the second emission window emits the measurement light in response to a control performed on the optical switch.

With this, it is possible to selectively control the directionality of sound pickup to enable a selective detection of: sounds from the arrival directions that are inclined toward the first direction in which the N measurement light beams are aligned; and sounds from the arrival directions that are inclined toward the second direction in which the M measurement light beams are aligned. This configuration enables more precise localization of the direction toward the sound source.

Hereinafter, the optical microphone according to an aspect of the present disclosure is described in greater detail with reference to the accompanying Drawings.

Each of the exemplary embodiments described below shows a general or specific example. The numerical values, shapes, materials, elements, the arrangement and connection of the elements, steps, the processing order of the steps etc. shown in the following exemplary embodiments are mere examples, and therefore do not limit the scope of the present disclosure. Therefore, among the elements in the following exemplary embodiments, those not recited in any one of the independent claims are described as optional elements.

Embodiment 1

The following describes the configuration of the optical microphone according to Embodiment 1.

FIG. 1 is a perspective view for schematically explaining the optical microphone according to Embodiment 1. FIG. 1 shows only frame-shaped member 140 among the elements of optical microphone 100.

Optical microphone 100 is a device that detects sounds which have propagated through predetermined space S1 inside of frame-shaped member 140. In so doing, optical microphone 100 causes N measurement light beams 144 to be emitted from one side portion of frame-shaped member 140 having a square shape toward another side of frame-shaped member 140 opposing the foregoing one side, where N is 8 in the present embodiment. N measurement light beams 144 are aligned in different positions along the X-axis direction. Each of N measurement light beams 144 detects sound. Stated differently, optical microphone 100 is capable of detecting sounds in the N different positions in the X-axis direction and detecting sounds from the arrival directions that include X-axis direction components, among the sounds that have propagated through predetermined space S1.

Figure 2:
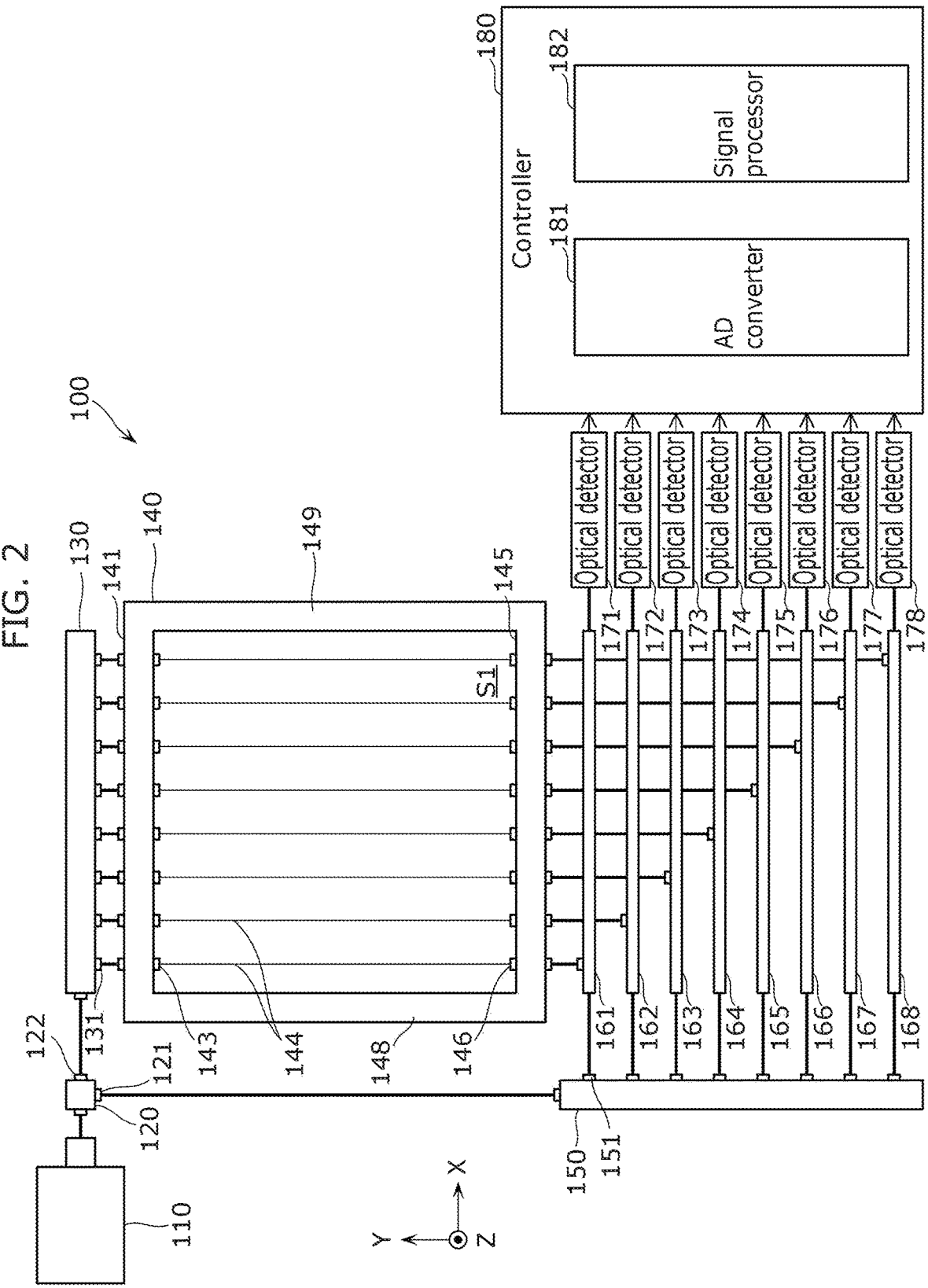
FIG. 2 is a diagram showing the configuration of the optical microphone according to Embodiment 1.

FIG. 2 is a diagram showing the configuration of the optical microphone according to Embodiment 1.

Optical microphone 100 includes light source 110, first optical divider 120, second optical divider 130, frame-shaped member 140, third optical divider 150, N optical couplers 161 through 168, N optical detectors 171 through 178, and controller 180.

Light source 110 emits light. Light source 110 is, for example, a laser light source that emits laser light.

First optical divider 120 divides the light emitted from light source 110 into two light beams. First optical divider 120 emits, from first emission window 121, reference light, which is one of the two divided light beams, and emits, from second emission window 122, measurement light, which is the other of the two light beams. First optical divider 120 is, for example, an optical coupler, an optical splitter, etc. Note that light source 110 and first optical divider 120 are optically connected via, for example, an optical fiber. First optical divider 120 receives, via the optical fiber, the light emitted from light source 110.

Second optical divider 130 divides the measurement light, which is one of the two light beams divided by first optical divider 120, into N measurement light beams, where N is 8 in the present embodiment, Second optical divider 130 is, for example, an optical coupler, an optical splitter, etc. Note that first optical divider 120 and second optical divider 130 are optically connected via, for example, an optical fiber. Second optical divider 130 receives, via the optical fiber, the measurement light emitted from second emission window 122 of first optical divider 120.

Frame-shaped member 140 has, for example, a square shape, Frame-shaped member 140 includes first emitter 141 that constitutes one side of frame-shaped member 140 at the side of the Y-axis positive direction and first light receiver 145 that constitutes one side of frame-shaped member 140 at the side of the Y-axis negative direction. Frame-shaped member 140 further includes two rod-like members 148 and 149. Member 148 connects one end and the other end of first emitter 141 having a rod-like shape and member 149 connects one end and the other end of first light receiver 145 having a rod-like shape. First emitter 141, first light receiver 145, and two members 148 and 149 surround predetermined space S1. Note that frame-shaped member 140 is a member for enabling first emitter 141 and first light receiver 145 to be disposed opposite to each other in the Y-axis direction across a space having the width of predetermined space S1. As such, the structure of frame-shaped member 140 is not limited to the foregoing structure so long as first emitter 141 and first light receiver 145 are disposed opposite to each other in the Y-axis direction. In frame-shaped member 140, predetermined space S1 and an external space are communicated with each other, and thus sound from a sound source in the external space propagates through the air to propagate through predetermined space S1.

Note that second optical divider 130 and first emitter 141 are optically connected via, for example, N optical fibers. First emitter 141 receives, via the N optical fibers, the N measurement light beams emitted from N emission windows 131 of second optical divider 130. First emitter 141 receives the N measurement light beams divided by second optical divider 130 and emits N measurement light beams 144 from mutually different positions toward predetermined space S1. First emitter 141 includes N collimating lenses 143 that are disposed in mutually different positions along the X-axis direction and that convert the N measurement light beams received from N emission windows 131 into collimated light beams. N collimating lenses 143 are disposed at equal intervals along the X-axis direction. First emitter 141 emits N measurement light beams 144 toward predetermined space S1 via N collimating lenses 143. Stated differently, N measurement light beams 144 that propagate through predetermined space S1 are each collimated light. Note that only the N measurement light beams that propagate through predetermined space S1 are assigned the reference mark "144" in the following description.

First light receiver 145 receives N measurement light beams 144 that have propagated through predetermined space S1, First light receiver 145 includes N collimating lenses 146 that are disposed opposite to N collimating lenses 143 across predetermined space S1. As with N collimating lenses 143, N collimating lenses 146 are disposed in mutually different positions along the X-axis direction. As with N collimating lenses 143, N collimating lenses 146 are disposed at equal intervals along the X-axis direction. N collimating lenses 146 are disposed opposite to N collimating lenses 143 in the Y-axis direction. As such, N measurement light beams 144 converted into collimated light beams by N collimating lenses 143 and emitted from N collimating lenses 143 in parallel in the Y-axis direction are received by first light receiver 145 via N collimating lenses 146. This causes N measurement light beams 144 to be emitted in predetermined space S1 parallel to one another and aligned at equal intervals along the X-axis direction.

Third optical divider 150 divides the reference light, which is one of the two light beams divided by first optical divider 120, into N reference light beams. Third optical divider 150 is, for example, an optical coupler, an optical splitter, etc. Note that first optical divider 120 and third optical divider 150 are optically connected via, for example, an optical fiber. Third optical divider 150 receives, via the optical fiber, the reference light emitted from first emission window 121 of first optical divider 120.

N optical couplers 161 through 168 couple N measurement light beams 144 received by first light receiver 145 with the N reference light beams on a one-to-once basis. N optical couplers 161 through 168 are, for example, optical couplers, etc. Note that first light receiver 145 and N optical couplers 161 through 168 are optically connected via, for example, optical fibers, N optical couplers 161 through 168 receive, via the respective optical fibers, N measurement light beams 144 emitted from first light receiver 145. Also, N emission windows 151 of third optical divider 150 and N optical couplers 161 through 168 are optically connected via, for example, optical fibers, N optical couplers 161 through 168 receive, via the respective optical fibers, N reference light beams emitted from N emission windows 151 of third optical divider 150, For example, each of N optical couplers 161 through 168 couples one of N measurement light beams 144 with one of the N reference light beams. It is highly possible that N measurement light beams 144 have mutually different properties, whereas the N reference light beams have mutually the same properties.

N optical detectors 171 through 178 receive the N coupled light beams coupled by N optical couplers 161 through 168 and each detect interference between the measurement light beam and the reference light beam in the corresponding one of the N coupled light beams. Stated differently, optical detector 171 detects interference between the measurement light beam and the reference light beam coupled by optical coupler 161. Optical detector 172 detects interference between the measurement light beam the reference light beam coupled by optical coupler 162. Optical detector 173 detects interference between the measurement light beam and the reference light beam coupled by optical coupler 163. Optical detector 174 detects interference between the measurement light beam and the reference light beam coupled by optical coupler 164. Optical detector 175 detects interference between the measurement light beam and the reference light beam coupled by optical coupler 165. Optical detector 176 detects interference between the measurement light beam and the reference light beam coupled by optical coupler 166. Optical detector 177 detects interference between the measurement light beam the reference light beam coupled by optical coupler 167. Optical detector 178 detects interference between the measurement light beam and the reference light beam coupled by optical coupler 168. N optical detectors 171 through 178 are photoelectric conversion elements such as, for example, photodiodes, imaging elements, etc. Stated differently, N optical detectors 171 through 178 each output a detection signal obtained by converting light interference into an electrical signal.

Controller 180 controls the directionality of picking up sounds on the basis of the N detection signals outputted from N optical detectors 171 through 178. Controller 180 includes analog to digital (AD) converter 181 and signal processor 182.

AD converter 181 performs AD conversion on the N detection signals outputted from N optical detectors 171 through 178.

Signal processor 182 performs signal processing on the N detection signals, thereby controlling the directionality of picking up sounds that propagate through predetermined space S1. Signal processor 182 performs signal processing on the N detection signals outputted from N optical detectors 171 through 178, thereby controlling the directionality of picking up sounds in the direction in which N measurement light beams 144 are aligned, i.e., the X-axis direction. For example, signal processor 182 controls the directionality of sound pickup to obtain the sound from one arrival direction in angle range D1 that extends in the X-axis direction from the reference point in predetermined space S1. Such arrival direction is a direction that includes a component of the X-axis direction in which N measurement light beams 144 are aligned in predetermined space S1 and a component of the Z-axis direction.

Figure 3:
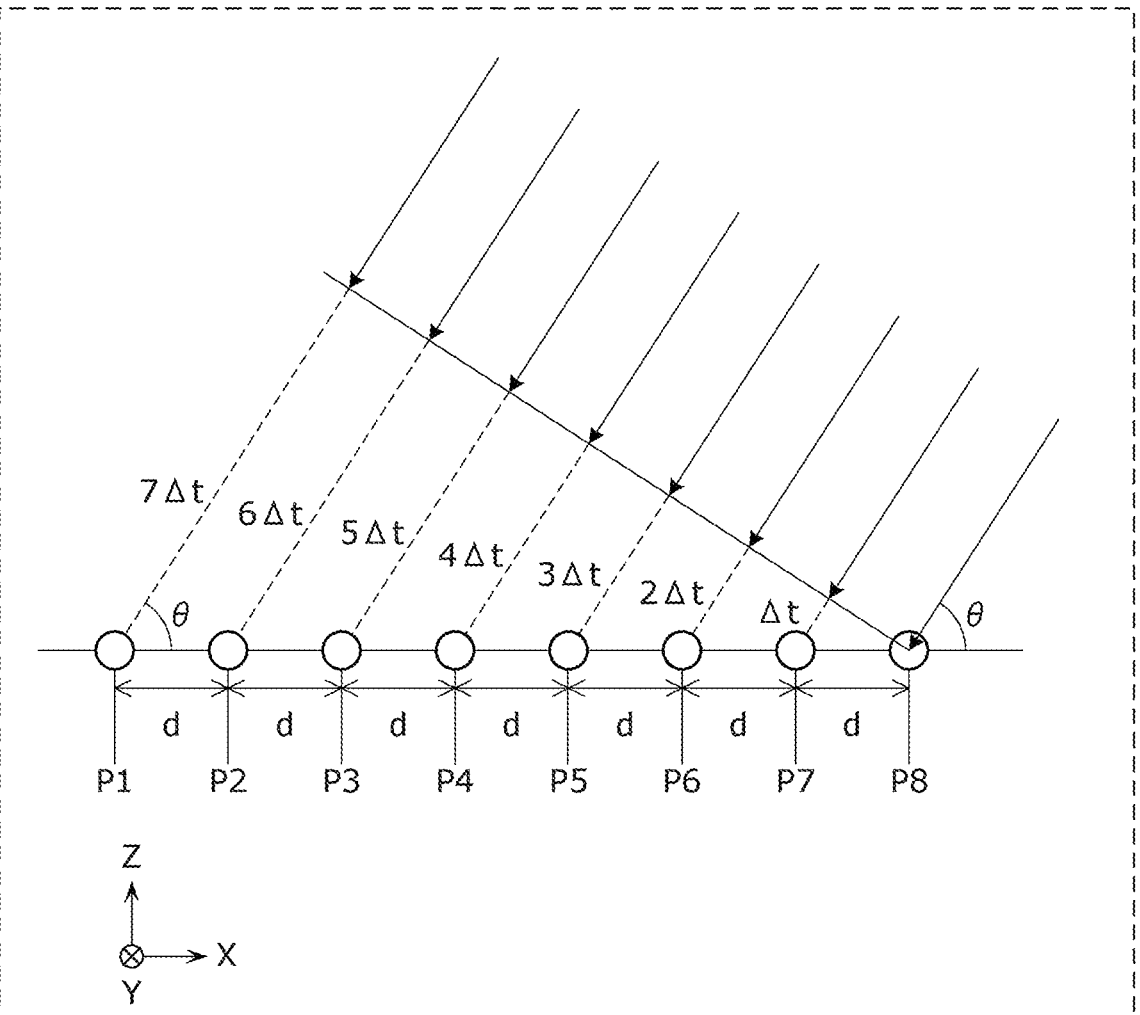
FIG. 3 is a diagram showing a relation between the optical microphone according to Embodiment 1 and arrival directions of the sound source.

FIG. 3 is a diagram showing a relation between the optical microphone according to Embodiment 1 and arrival directions of the sound source.

Eight positions P1 through P8 in FIG. 3 correspond to the positions from which eight measurement light beams 144 are emitted. When sounds are detected by N measurement light beams 144 that are aligned at equal intervals in the X-axis direction as in the case of optical microphone 100, the sound from the arrival direction that is inclined at the angle of θ relative to the X-axis direction is first detected by measurement light beam 144 at position P8. Thereafter, sounds are detected by measurement light beams 144 in position P7, position P6, position P5, position P4, position P3, position P2, and position P1 in stated order at respective times Δt. This is because eight positions P1 through P8 of N measurement light beams 144 are aligned at equal intervals of predetermined distances d. From this, Expression 1 shown below is satisfied, where V is the sound velocity.

$$\Delta t = d \cdot \cos \theta / V \qquad \text{(Expression 1)}$$

Figure 4:
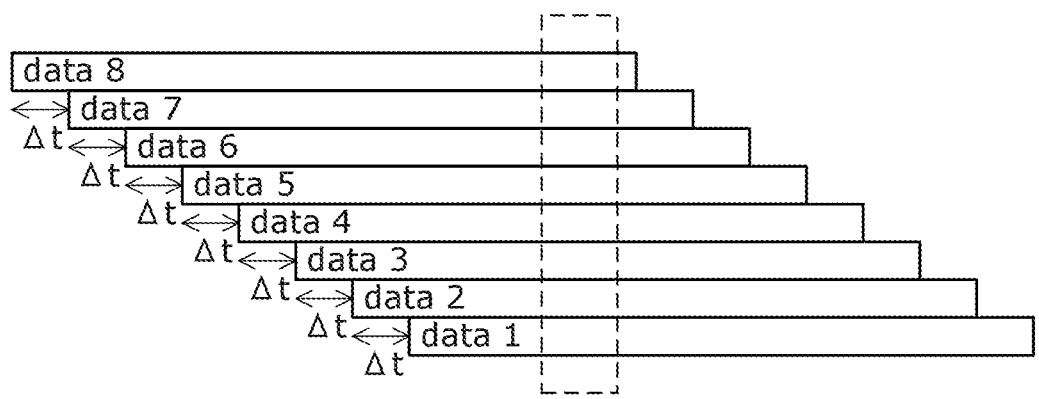
FIG. 4 is a diagram for explaining signal processing performed by the optical microphone according to Embodiment 1.

FIG. 4 is a diagram for explaining signal processing performed by the optical microphone according to Embodiment 1.

As shown in FIG. 3, sound from the arrival direction that is inclined at the angle of θ relative to the X-axis direction is first detected by measurement light beam 144 in position P8, after which sounds are detected in positions P7 through P1 in stated order at respective times Δt. For this reason, controller 180 is able to detect sounds from the arrival directions that are inclined at the angle of θ relative to the X-axis direction by adding data 1 through data 8, which are the eight detection signals obtained, after delaying each of data 7 through data 1 at the interval of time Δt from data 8. For example, signal processor 182 adds data 1 through data 8 indicated by the broken lines in FIG. 4 to detect the sounds from the arrival directions that are inclined at the angle of θ relative to the X-axis direction.

Optical microphone 100 according to the present embodiment includes light source 110, first optical divider 120, second optical divider 130, first emitter 141, first light receiver 145, third optical divider 150, N optical couplers 161 through 168, N optical detectors 171 thorough 178, and controller 180. First optical divider 120 divides light emitted from light source 110 into reference light and measurement light. Second optical divider 130 divides the measurement light into N measurement light beams, where N is an integer greater than or equal to 2. First emitter 141 emits the N measurement light beams from mutually different positions toward predetermined space S1. First light receiver 145 receives N measurement light beams 144 that have propagated through predetermined space S1. Third optical divider 150 divides the reference light into N reference light beams. N optical couplers 161 through 168 couple the N measurement light beams received by first light receiver 145 with the N reference light beams on a one-to-once basis. N optical detectors 171 through 178 receive the N coupled light beams coupled by N optical couplers 161 through 168 and each detect interference between the measurement light beam and the reference light beam in the corresponding one of the N coupled light beams. Controller 180 performs signal processing on the N detection signals outputted from N optical detectors 171 through 178, thereby controlling the directionality of picking up sounds.

With this configuration, sounds are detected in N different positions P1 through P8 in the following manner: the N measurement light beams are caused to pass through predetermined space S1 intended for sound detection; interferences are detected in the reference light beams and N measurement light beams 144 that are modulated in accordance with air density caused by the sounds that propagate through the air in predetermined space S1; and signal processing is performed on the resulting N detection signals. With this, it is possible to control the directionality of sound pickup to enable sounds to be detected from the arrival directions that are inclined at an angle relative to predetermined space S1 toward the direction in which N measurement light beams 144 are aligned.

Also, in optical microphone 100 according to the present embodiment, first emitter 141 includes N collimating lenses 143 that are disposed in mutually different positions and that convert the N measurement light beams into collimated light beams. Also, first light receiver 145 includes N collimating lenses 146 that are disposed opposite to N collimating lenses 143 across predetermined space S1. N collimating lenses 146 receive N measurement light beams 144 converted into collimated light beams by N collimating lenses 143. With this, it is possible to effectively detect air density caused by propagating sounds because N measurement light beams 144 that propagate through predetermined space S1 are each converted into collimated light.

Also, in optical microphone 100 according to the present embodiment, N collimating lenses 143 and N collimating lenses 146 may be disposed so that N measurement light beams 144 converted into collimated light beams are aligned parallel to one another at equal intervals in predetermined space S1. This disposition enables easy detection of sounds propagating toward the predetermined space from the arrival directions that are inclined at an angle toward the direction in which the N measurement light beams are aligned. This also reduces processing load on the processes performed on the N signals. Note that antireflection coating may be applied to the surfaces of collimating lenses 143 and 146 in accordance with the frequencies of light source 110.

Variation of Embodiment 1.

The following describes the configuration of an optical microphone according to a variation of Embodiment 1.

Figure 5:
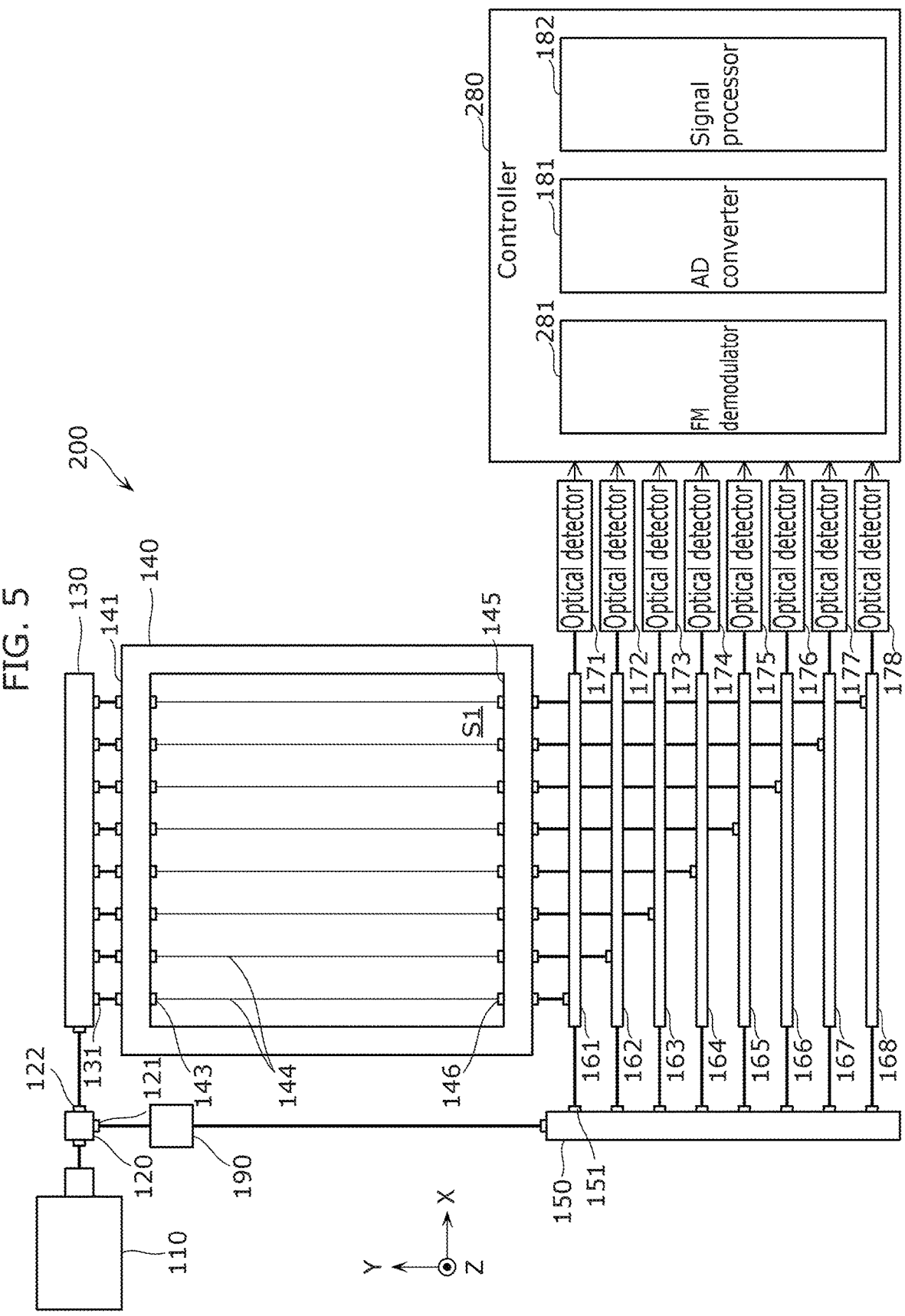
FIG. 5 is a diagram showing the configuration of an optical microphone according to a variation of Embodiment 1.

FIG. 5 is a diagram showing the configuration of the optical microphone according to a variation of Embodiment 1.

Optical microphone 200 according to a variation of Embodiment 1 is different from optical microphone 100 according to Embodiment 1 in that optical microphone 200 further includes optical modulator 190 and in the configuration of controller 280. Optical modulator 190 and controller 280 will be thus described. Note that the same elements as those of optical microphone 100 according to Embodiment 1 are assigned the same reference marks and will not be described.

Optical modulator 190 modulates the reference light, which is one of the two light beams divided by first optical divider 120, and outputs the modulated reference light to third optical divider 150. Optical modulator 190 performs, for example, frequency modulation (FM) on the reference light.

Controller 280 is different from controller 180 according to Embodiment 1 in that controller 280 further includes frequency modulation (FM) demodulator 281.

FM demodulator 281 demodulates the N detection signals outputted from N optical detectors 171 through 178. FM demodulator 281 outputs the demodulated N detection signals to AD converter 181.

The foregoing configuration achieves an effective sound detection because optical modulator 190 modulates the reference light, FM demodulator 281 demodulates the detection signals that result from detecting interferences between the modulated reference light beams and the measurement light beams, and signal processor 182 performs signal processing, using the demodulated detection signals. Examples of optical modulator 190 to be used include an acousto-optic modulator (AOM), an electro-optic modulator (EOM), etc. Also, without using optical modulator 190, light modulation may be performed by direct modulation in which modulation is directly applied on a light source.

Embodiment 2

The following describes the configuration of an optical microphone according to Embodiment 2.

Figure 6:
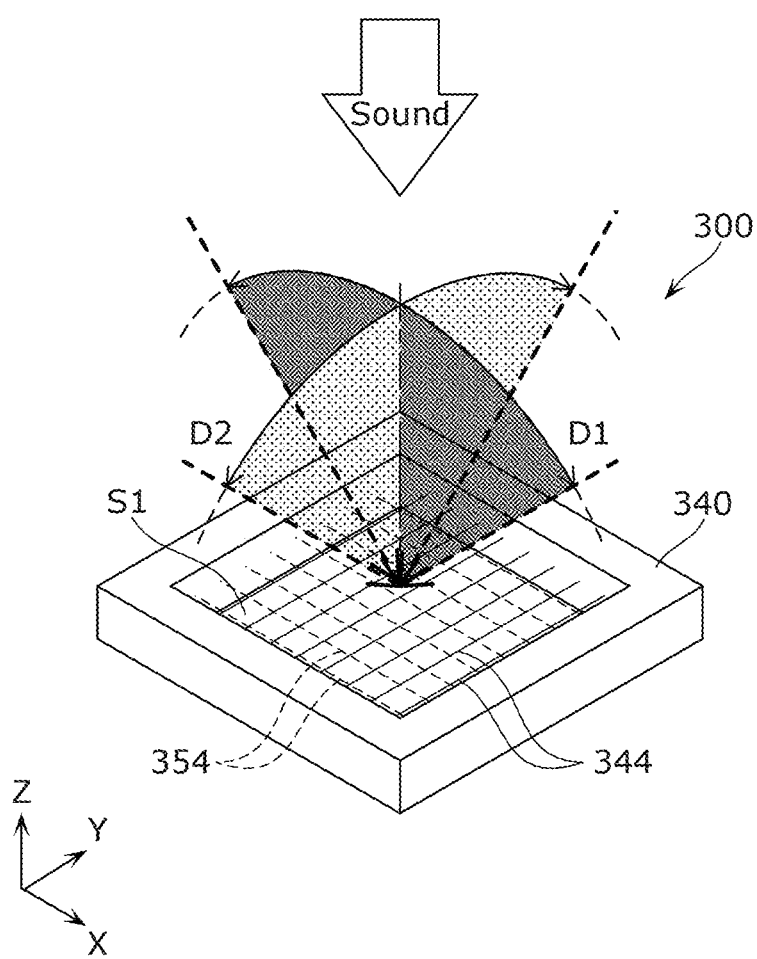
FIG. 6 is a perspective view for schematically explaining an optical microphone according to Embodiment 2.

FIG. 6 is a perspective view for schematically explaining the optical microphone according to Embodiment 2. FIG. 6 shows only frame-shaped member 340 among the elements of optical microphone 300.

Optical microphone 300 is different from optical microphone 100 according to Embodiment 1 in the following: to detect sounds, optical microphone 300 selectively switches between N measurement light beams 344, which are aligned in the X-axis direction and parallel with one another in the Y-axis direction, and M measurement light beams 354, which are aligned in the Y-axis direction and parallel with one another in the X-axis direction. Stated differently, optical microphone 300 is capable of selectively performing one of: detecting sounds in mutually different N positions along the X-axis direction; and detecting sounds in mutually different NI positions along the Y-axis direction. With this configuration, among the sounds that have propagated through predetermined space S1, optical microphone 300 is capable of selectively detecting one of: sounds from the arrival directions that include components of the X-axis direction; and sounds from the arrival directions that include components of the Y-axis direction.

Figure 7:
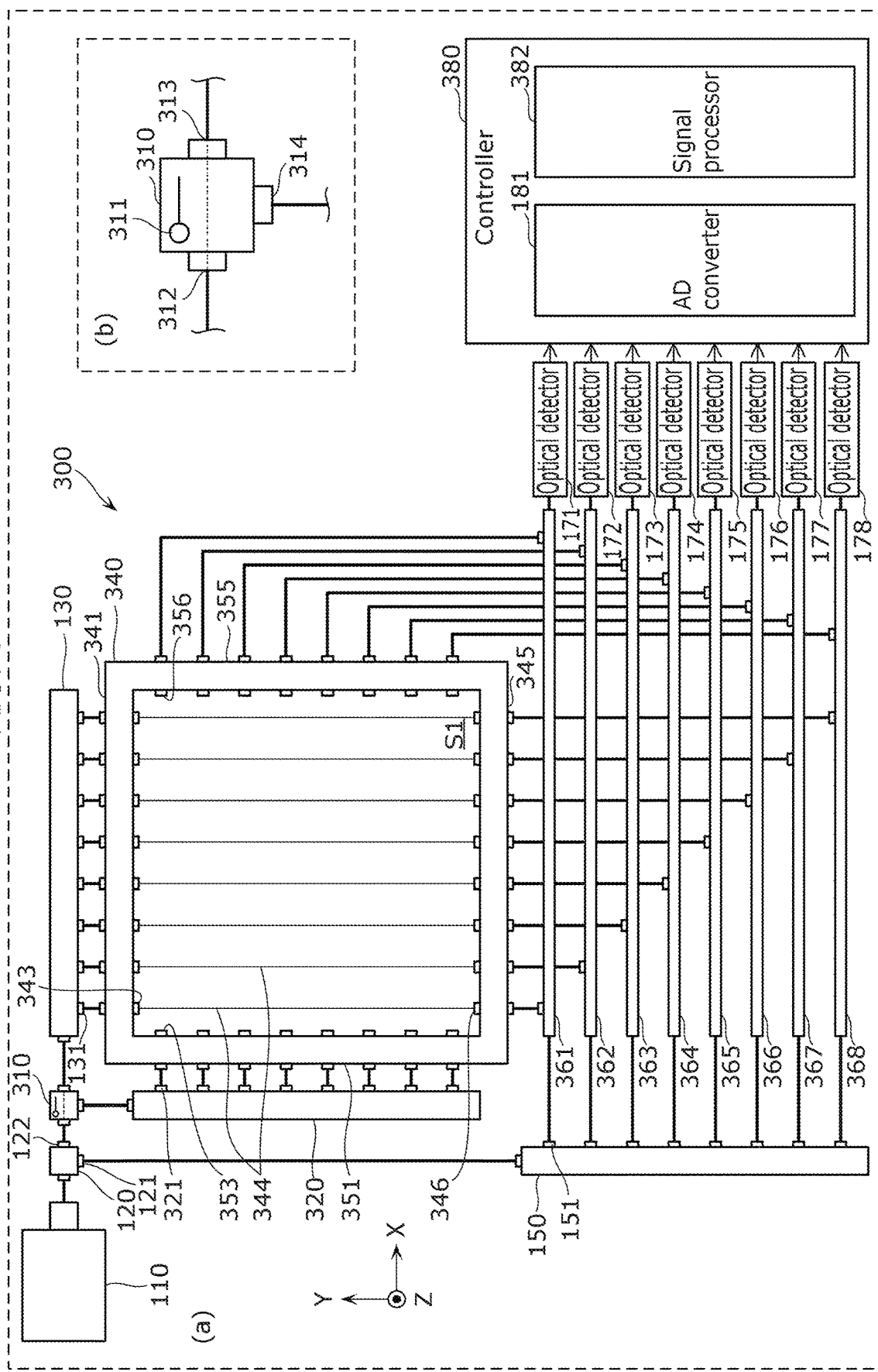
FIG. 7 is a diagram showing the configuration of the optical microphone according to Embodiment 2.
Figure 8:
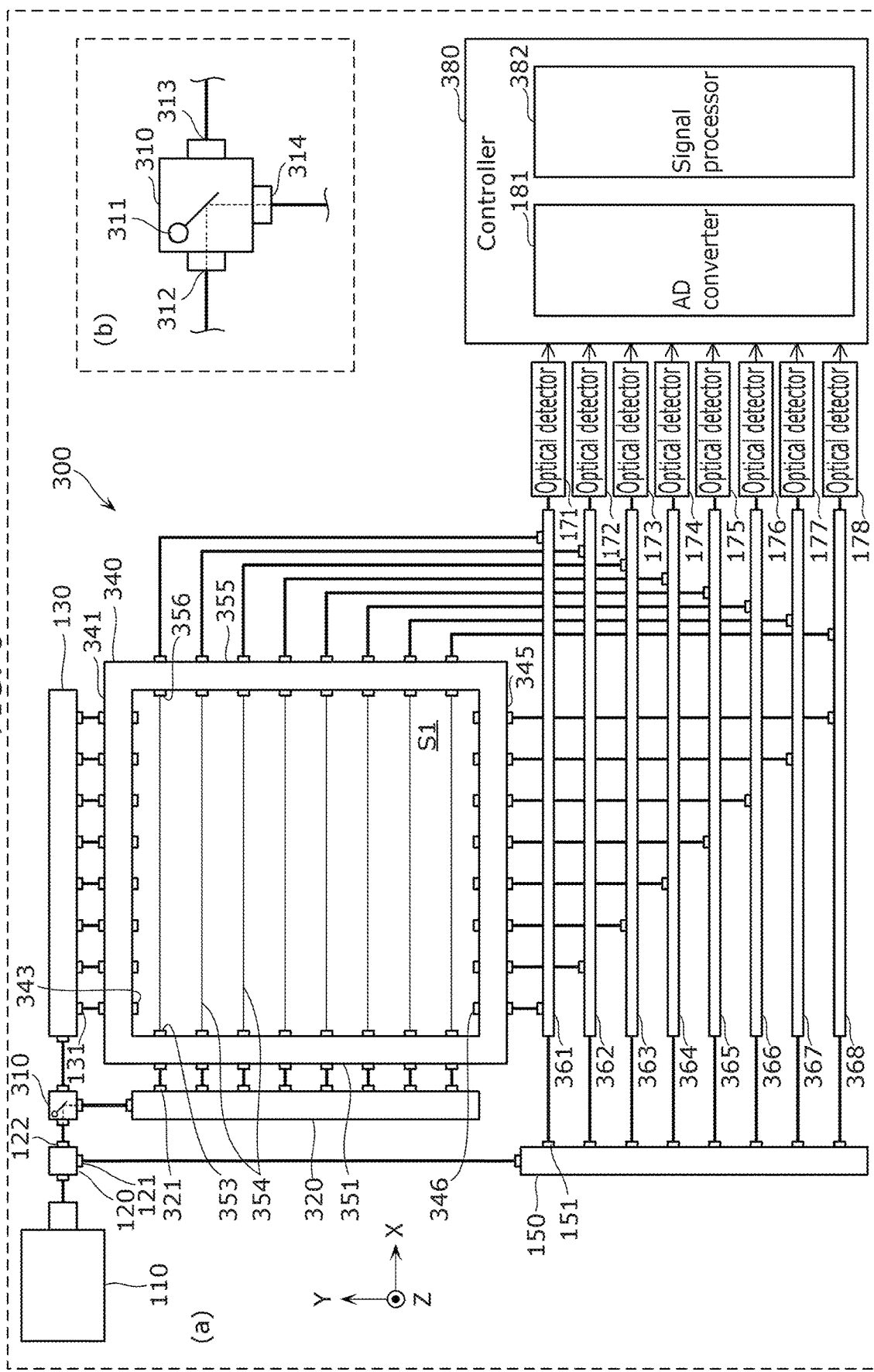
FIG. 8 is a diagram showing the configuration of the optical microphone according to Embodiment 2.

FIG. 7 and FIG. 8 are diagrams showing the configuration of the optical microphone according to Embodiment 2. FIG. 7 is a diagram showing optical switch 310 in a first state. (a) in FIG. 7 shows the configuration of optical microphone 300 when optical switch 310 is in the first state and (b) in FIG. 7 shows optical switch 310 in the first state. FIG. 8 is a diagram showing optical switch 310 in a second state. (a) in FIG. 8 shows the configuration of optical microphone 300 when optical switch 310 is in the second state and (b) in FIG. 8 shows optical switch 310 in the second state.

Optical microphone 300 includes light source 110, first optical divider 120, optical switch 310, second optical divider 130, fourth optical divider 320, frame-shaped member 340, third optical divider 150, N optical couplers 361 through 368, N optical detectors 171 through 178, and controller 180.

The following describes the elements different from those of optical microphone 100 according to Embodiment 1. The common elements are assigned the same reference marks and will not be described.

Optical switch 310 switches the destination of the measurement light emitted from first optical divider 120 selectively between a first emission destination and a second emission destination. As shown in (b) in FIG. 7 and (b) in FIG. 8, optical switch 310 includes optical path switcher 311, input window 312, first emission window 313, and second emission window 314.

Optical path switcher 311 is a mirror that reflects the measurement light. When optical switch 310 is in the first state, optical path switcher 311 is maintained in an orientation that is substantially parallel to an optical path that extends from input window 312 to first emission window 313 of optical switch 310 in a manner that optical path switcher 311 does not obstruct the optical path. With this, when optical switch 310 is in the first state, the measurement light is emitted from first emission window 313. When optical switch 310 is in the second state, optical path switcher 311 is maintained in an orientation that is orthogonal to the optical path that extends from input window 312 to first emission window 313 of optical switch 310. With this, the measurement light inputted from input window 312 is reflected by optical path switcher 311 toward second emission window 314. With this, when optical switch 310 is in the second state, the measurement light is emitted from second emission window 314.

Second optical divider 130 divides the measurement light emitted from first emission window 313 of optical switch 310 in the first state into N measurement light beams, where N is 8 in the present embodiment. The configuration of second optical divider 130 is the same as that of Embodiment 1. Note that first emission window 313 of optical switch 310 and second optical divider 130 are optically connected via, for example, an optical fiber. Second optical divider 130 receives, via the optical fiber, the light emitted from first emission window 313 of optical switch 310.

Fourth optical divider 320 divides the measurement light emitted from second emission window 314 of optical switch 310 in the second state into M measurement light beams, where M is 8 in the present embodiment. Note that N and M may be the same integer greater than or equal to 2. Also, M may be a value smaller than N. Fourth optical divider 320 is, for example, an optical coupler, an optical splitter, etc. The configuration of fourth optical divider 320 is the same as that of second optical divider 130. Note that second emission window 314 of optical switch 310 and fourth optical divider 320 are optically connected via, for example, an optical fiber. Fourth optical divider 320 receives, via the optical fiber, the light emitted from second emission window 314 of optical switch 310.

Frame-shaped member 340 has, for example, a square shape. Frame-shaped member 340 includes first emitter 341 that constitutes one side of frame-shaped member 340 at the side of the Y-axis positive direction, first light receiver 345 that constitutes one side of frame-shaped member 340 at the side of the Y-axis negative direction, second emitter 351 that constitutes one side of frame-shaped member 340 at the side of the X-axis negative direction, and second light receiver 355 that constitutes one side of frame-shaped member 340 at the side of the X-axis positive direction. First emitter 341, first light receiver 345, second emitter 351, and second light receiver 355 surround predetermined space S1, Note that frame-shaped member 340 is a member for enabling first emitter 341 and first light receiver 345 to be disposed opposite to each other in the Y-axis direction across a space having the width of predetermined space S1 and enabling second emitter 351 and second light receiver 355 to be disposed opposite to each other in the X-axis direction across a space having the width of predetermined space S1. As such, the structure of frame-shaped member 340 is not limited to the foregoing structure so long as first emitter 341 and first light receiver 345 are disposed opposite to each other in the Y-axis direction and second emitter 351 and second light receiver 355 are disposed opposite to each other in the X-axis direction. In frame-shaped member 340, predetermined space S1 and an external space are communicated with each other, and thus sound from a sound source in the external space propagates through the air to propagate through predetermined space S1.

Note that second optical divider 130 and first emitter 341 are optically connected via, for example, N optical fibers. First emitter 341 receives, via the N optical fibers, the N measurement light beams emitted from N emission windows 131 of second optical divider 130. First emitter 341 receives the N measurement light beams divided by second optical divider 130 and emits N measurement light beams 344 from mutually different positions toward predetermined space S1 as shown in (a) in FIG. 7. First emitter 341 includes N collimating lenses 343 that are disposed in mutually different positions along the X-axis direction and that convert the N measurement light beams received from N emission windows 131 into collimated light beams. N collimating lenses 343 are disposed at equal intervals along the X-axis direction. First emitter 341 emits N measurement light beams 344 toward predetermined space S1 via N collimating lenses 343. Stated differently, N measurement light beams 344 that propagate through predetermined space S1 are each collimated light. Note that only the N measurement light beams that propagate through predetermined space S1 are assigned the reference mark "344" in the following description.

Also, fourth optical divider 320 and second emitter 351 are optically connected via, for example, M optical fibers. Second emitter 351 receives, via the M optical fibers, the M measurement light beams emitted from M emission windows 321 of fourth optical divider 320. Second emitter 351 receives the M measurement light beams divided by fourth optical divider 320 and emits M measurement light beams 354 from mutually different positions toward predetermined space S1 as shown in (a) in FIG. 8. Second emitter 351 includes M collimating lenses 353 that are disposed in mutually different positions along the Y-axis direction and that convert the M measurement light beams received from M emission windows 321 into collimated light beams. M collimating lenses 353 are disposed at equal intervals along the Y-axis direction. Second emitter 351 emits M measurement light beams 354 toward predetermined space S1 via M collimating lenses 353. Stated differently, M measurement light beams 354 that propagate through predetermined space S1 are each collimated light. Note that only the M measurement light beams that propagate through predetermined space S1 are assigned the reference mark "354" in the following description.

First light receiver 345 receives N measurement light beams 344 that have propagated through predetermined space S1. First light receiver 345 includes N collimating lenses 346 that are disposed opposite to N collimating lenses 343 across predetermined space S1. As with N collimating lenses 343, N collimating lenses 346 are disposed in mutually different positions along the X-axis direction. As with N collimating lenses 343, N collimating lenses 346 are disposed at equal intervals along the X-axis direction. N collimating lenses 346 are disposed opposite to N collimating lenses 343 along the Y-axis direction. As such, N measurement light beams 344 converted into collimated light beams by N collimating lenses 343 and emitted from N collimating lenses 343 in parallel in the Y-axis direction are received by first light receiver 345 via N collimating lenses 346. This causes N measurement light beams 344 to be emitted in predetermined space S1 parallel to one another and aligned at equal intervals along the X-axis direction.

Second light receiver 355 receives M measurement light beams 354 that have propagated through predetermined space S1. Second light receiver 355 includes M collimating lenses 356 that are disposed opposite to M collimating lenses 353 across predetermined space S1. As with M collimating lenses 353, M collimating lenses 356 are disposed in mutually different positions along the Y-axis direction. As with M collimating lenses 353, M collimating lenses 356 are disposed at equal intervals along the Y-axis direction. M collimating lenses 356 are disposed opposite to M collimating lenses 353 along the X-axis direction. As such, M measurement light beams 354 converted into collimated light beams by M collimating lenses 353 and emitted from M collimating lenses 353 in parallel in the Y-axis direction are received by second light receiver 355 via M collimating lenses 356. This causes M measurement light beams 354 to be emitted in predetermined space S1 parallel to one another and aligned at equal intervals along the Y-axis direction.

A first emission direction in which first emitter 341 emits N measurement light beams 344 is the Y-axis direction and a second emission direction in which second emitter 351 emits M measurement light beams 354 is the X-axis direction. Stated differently, the first emission direction and the second emission direction intersect with each other (e.g., orthogonal to each other).

When optical switch 310 is in the first state, N optical couplers 361 through 368 couple N measurement light beams 344 received by first light receiver 345 with the N reference light beams on a one-to-once basis. When optical switch 310 is in the second state, N optical couplers 361 through 368 couple M measurement light beams 354 received by second light receiver 355 with the N reference light beams on a one-to-once basis. In the present embodiment, both N and M are 8 when optical switch 310 is in the second state. As such, eight measurement light beams 354 and the eight reference light beams are coupled on a one-to-one basis. When N and M are different values, the number of measurement light beams corresponding to the smaller value and the number of reference light beams corresponding to the greater value are coupled on a one-to-one basis. Stated differently, the measurement light beams corresponding to the smaller value are coupled without fail with reference light beams on a one-to-one basis. Note that N optical couplers 361 through 368 are, for example, optical couplers, etc.

Note that first light receiver 345 and N optical couplers 361 through 368 are optically connected via, for example, optical fibers. N optical couplers 361 through 368 receive, via the respective optical fibers, N measurement light beams 344 emitted from first light receiver 345. Also, second light receiver 355 and N optical couplers 361 through 368 are optically connected via, for example, optical fibers. N optical couplers 361 through 368 receive, via the respective optical fibers, M measurement light beams 354 emitted from second light receiver 355. Also, N emission windows 151 of third optical divider 150 and N optical couplers 361 through 368 are optically connected via, for example, optical fibers. N optical couplers 361 through 368 receive, via the respective optical fibers, N reference light beams emitted from N emission windows 151 of third optical divider 150, For example, each of N optical couplers 361 through 368 couples one of N measurement light beams 344 or one of the M measurement light beams with one of the N reference light beams. It is highly possible that N measurement light beams 344 have mutually different properties and M measurement light beams 354 have mutually different properties, whereas the N reference light beams have mutually the same properties.

N optical detectors 171 through 178 receive the N coupled light beams coupled by N optical couplers 361 through 368 and each detect interference between the measurement light beam and the reference light beam in the corresponding one of the N coupled light beams. Stated differently, optical detector 171 detects interference between the measurement light beam and the reference light beam coupled by optical coupler 361. Optical detector 172 detects interference between the measurement light beam and the reference light beam coupled by optical coupler 362. Optical detector 173 detects interference between the measurement light beam and the reference light beam coupled by optical coupler 363. Optical detector 174 detects interference between the measurement light beam and the reference light beam coupled by optical coupler 364. Optical detector 175 detects interference between the measurement light beam and the reference light beam coupled by optical coupler 365. Optical detector 176 detects interference between the measurement light beam and the reference light beam coupled by optical coupler 366. Optical detector 177 detects interference between the measurement light beam and the reference light beam coupled by optical coupler 367. Optical detector 178 detects interference between the measurement light beam and the reference light beam coupled by optical coupler 368. N optical detectors 171 through 178 are photoelectric conversion elements such as, for example, photodiodes, imaging elements, etc. Stated differently, N optical detectors 171 through 178 each output a detection signal obtained by converting light interference into an electrical signal.

Signal processor 382 of controller 180 performs signal processing on the N detection signals, thereby controlling the directionality of picking up sounds that propagate through predetermined space S1. Signal processor 382 controls the directionality of sound pickup in the direction in which the N measurement light beams are aligned, i.e., the X-axis direction by performing signal processing on the N detection signals that are outputted from N optical detectors 171 through 178 when first emission window 313 emits the measurement light in response to a control of causing optical switch 310 to be in the first state. For example, signal processor 382 controls the directionality of sound pickup so that sounds are obtained from a first arrival direction in angle range D1 shown in FIG. 6 that extends in the X-axis direction from the reference point in predetermined space S1. Such first arrival direction is a direction that includes a component of the X-axis direction in which N measurement light beams 344 are aligned in predetermined space S1 and a component of the Z-axis direction.

Also, signal processor 382 controls the directionality of sound pickup in the direction in which the M measurement light beams are aligned, i.e., the Y-axis direction by performing signal processing on the M detection signals that are outputted from M optical detectors 171 through 178 when second emission window 314 emits the measurement light in response to a control of causing optical switch 310 to be in the second state. For example, signal processor 382 controls the directionality of sound pickup so that sounds are obtained from a second arrival direction in angle range D2 shown in FIG. 6 that extends in the Y-axis direction from the reference point in predetermined space S1. Such second arrival direction is a direction that includes a component of the Y-axis direction in which M measurement light beams 354 are aligned in predetermined space S1 and a component of the Z-axis direction.

Optical microphone 300 according to the present embodiment is capable of selectively controlling the directionality of sound pickup to enable a selective detection of sounds from the first arrival direction that is inclined toward the X-axis direction in which N measurement light beams 344 are aligned and sounds from the second arrival direction that is inclined toward the Y-axis direction in which M measurement light beams 354 are aligned. This configuration enables more precise localization of the direction toward the sound source.

Note that the above-described technology is intended for detecting arrival directions on the basis of two axes, the X-axis and the Y-axis, but may also be capable of detecting sound arrival directions on the basis of three or more axes by further adding, for example, the Z-axis. Also, the present technology may be capable of scanning sound arrival directions by driving the microphone array itself by an actuator.

The optical microphone according to one or more aspects of the present disclosure has been described above on the basis of exemplary embodiments but the present disclosure is not limited to such embodiments. The scope of the one or more aspects of the present disclosure may also include: an embodiment achieved by making various modifications to the embodiments that can be conceived by those skilled in the art without departing from the essence of the present disclosure; and an embodiment achieved by combining some of the elements in a different embodiment.

INDUSTRIAL APPLICABILITY

The present disclosure is applicable for use as an optical microphone, etc. capable of localizing the direction to a sound source.

The invention claimed is:

1. An optical microphone comprising:
   a light source;
   a first optical divider that divides light emitted from the light source into reference light and measurement light;
   a second optical divider that divides the measurement light into N measurement light beams, where N is an integer greater than or equal to 2;
   a first emitter that emits the N measurement light beams from mutually different positions toward a predetermined space;
   a first light receiver that receives the N measurement light beams that have propagated through the predetermined space;
   a third optical divider that divides the reference light into N reference light beams;
   N optical couplers that couple the N measurement light beams received by the first light receiver with the N reference light beams on a one-to-one basis;
   N optical detectors that receive N coupled light beams coupled by the N optical couplers, each of the N optical detectors detecting interference between a corresponding one of the N measurement light beams and a corresponding one of the N reference light beams in a corresponding one of the N coupled light beams; and
   a controller that controls directionality of sound pickup by performing signal processing on N detection signals outputted from the N optical detectors.

2. The optical microphone according to claim 1,
   wherein the first emitter includes N first collimating lenses that are disposed in the mutually different positions and convert the N measurement light beams into collimated light beams,
   the first light receiver includes N second collimating lenses that are disposed opposite to the N first collimating lenses across the predetermined space, and
   the N second collimated lenses receive the N measurement light beams that have been converted into the collimated light beams by the N first collimating lenses.

3. The optical microphone according to claim 2,
   wherein the N first collimating lenses and the N second collimating lenses are disposed to cause the N measurement light beams converted into the collimated light beams to be aligned parallel to each other at equal intervals in the predetermined space.

4. The optical microphone according to claim 1, further comprising:
   an optical modulator that modulates the reference light and outputs the reference light modulated to the third optical divider,
   wherein the controller includes:
   a frequency modulation (FM) demodulator that demodulates the N detection signals;
   an analog to digital (AD) converter that performs an AD conversion on the N detection signals; and
   a signal processor that performs the signal processing on the N detection signals that have undergone the AD conversion.

5. The optical microphone according to claim 1, further comprising:
   an optical switch that selectively switches a destination to which the first optical divider emits the measurement light between a first emission window and a second emission window, the first emission window being optically connected to the second optical divider;
   a fourth optical divider that divides the measurement light emitted from the second emission window into M measurement light beams, where M is an integer between 2 and N, inclusive;
   a second emitter that emits the NI measurement light beams divided by the fourth optical divider from mutually different positions toward the predetermined space; and
   a second light receiver that receives the M measurement light beams that have propagated through the predetermined space,
   wherein a first emission direction and a second emission direction intersect with each other, the first emission direction being a direction in which the first emitter emits the N measurement light beams, the second emission direction being a direction in which the second emitter emits the M measurement light beams,
   M optical couplers among the N optical couplers couple the M measurement light beams received by the second light receiver with M reference light beams among the N reference light beams on a one-to-one basis,
   M optical detectors among the N optical detectors receive M coupled light beams coupled by the M optical couplers, each of the M optical detectors detecting interference between a corresponding one of the M measurement light beams and a corresponding one of the M reference light beams in a corresponding one of the M coupled light beams, and
   the controller
   (i) controls the directionality of sound pickup along a direction in which the N measurement light beams are aligned by performing the signal processing on the N detection signals that are outputted from the N optical detectors when the first emission window emits the measurement light in response to a control performed on the optical switch, and
   (ii) controls the directionality of sound pickup along a direction in which the M measurement light beams are aligned by performing the signal processing on the M detection signals that are outputted from the M optical detectors when the second emission window emits the measurement light in response to a control performed on the optical switch.

* * * * *